United States Patent
Fujino

(10) Patent No.: US 10,481,363 B2
(45) Date of Patent: Nov. 19, 2019

(54) PROJECTOR AND FOCUS ADJUSTMENT METHOD

(71) Applicant: NEC Display Solutions, Ltd., Tokyo (JP)

(72) Inventor: Shigeru Fujino, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 16/070,211

(22) PCT Filed: Feb. 3, 2016

(86) PCT No.: PCT/JP2016/053269
§ 371 (c)(1),
(2) Date: Jul. 13, 2018

(87) PCT Pub. No.: WO2017/134781
PCT Pub. Date: Aug. 10, 2017

(65) Prior Publication Data
US 2019/0018220 A1    Jan. 17, 2019

(51) Int. Cl.
*G02B 7/28* (2006.01)
*G03B 21/00* (2006.01)
(Continued)

(52) U.S. Cl.
CPC ............ *G02B 7/28* (2013.01); *G03B 13/32* (2013.01); *G03B 21/00* (2013.01); *G03B 21/14* (2013.01);
(Continued)

(58) Field of Classification Search
CPC .......... G02B 7/28; G03B 13/32; G03B 21/00; G03B 21/14; G03B 21/53; H04N 5/23; H04N 5/74; H04N 9/31
See application file for complete search history.

(56) References Cited

U.S. PATENT DOCUMENTS

2006/0280360 A1* 12/2006 Holub ................. G01J 3/02
                                                       382/162
2017/0318270 A1* 11/2017 Fukuda ................ H04N 5/74
2019/0018306 A1*  1/2019 Kasuga ................ G02B 7/09

FOREIGN PATENT DOCUMENTS

JP       2004-347907 A    12/2004
JP       2005-031286 A     2/2005
(Continued)

OTHER PUBLICATIONS

Machine translation of JP-2015115801, electronically retrieved from Espacenet on Mar. 30, 2019.*
(Continued)

*Primary Examiner* — Sultan Chowdhury
*Assistant Examiner* — Danell L Owens
(74) *Attorney, Agent, or Firm* — McGinn IP Law Group, PLLC

(57) ABSTRACT

A projector including: a display unit equipped with an image-forming surface made up of a plurality of pixels; a projection lens that is capable of focus adjustment and that projects an image that is formed on the image-forming surface onto a projection surface; a distortion correction processing unit that, on the basis of distortion correction data for correcting distortion of an image projected onto the projection surface, generates a corrected image by enlarging and/or reducing an image indicated by an input video signal and forms the corrected image on the image-forming surface; and a control unit that adjusts the focus of the projection lens on the basis of the distortion correction data such that a focus range on the projection surface is increased.

7 Claims, 10 Drawing Sheets

(51) Int. Cl.
*G03B 21/14* (2006.01)
*G03B 21/53* (2006.01)
*H04N 5/74* (2006.01)
*H04N 9/31* (2006.01)
*G03B 13/32* (2006.01)
*H04N 5/232* (2006.01)

(52) U.S. Cl.
CPC ......... *G03B 21/53* (2013.01); *H04N 5/23212* (2013.01); *H04N 5/74* (2013.01); *H04N 9/31* (2013.01); *H04N 9/317* (2013.01); *H04N 9/3185* (2013.01)

(56) References Cited

FOREIGN PATENT DOCUMENTS

| | | |
|---|---|---|
| JP | 2005-150919 A | 6/2005 |
| JP | 2014-197739 A | 10/2014 |
| JP | 2015-115788 A | 6/2015 |
| JP | 2015-115801 A | 6/2015 |

OTHER PUBLICATIONS

International Search Report (ISR) (PCT Form PCT/ISA/210), in PCT/JP2016/053269, dated Apr. 12, 2016.

\* cited by examiner

[Figure 1]
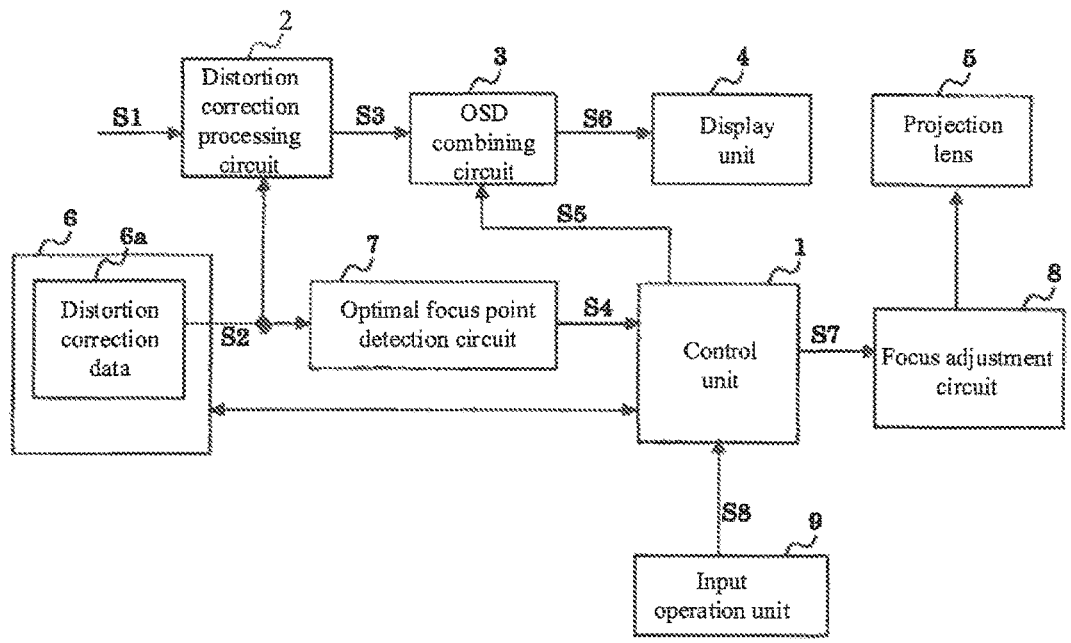
[Figure 2]
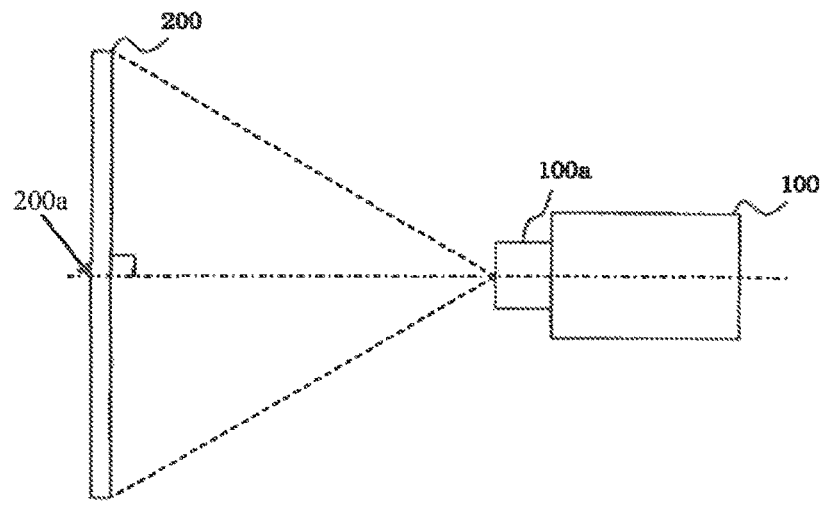

[Figure 3]
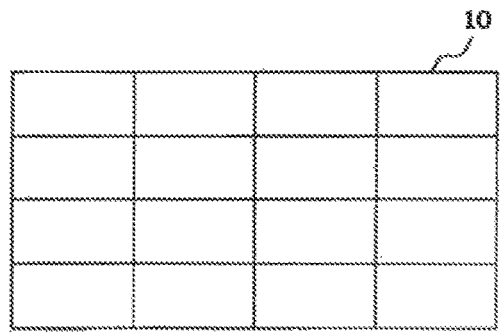
[Figure 4]
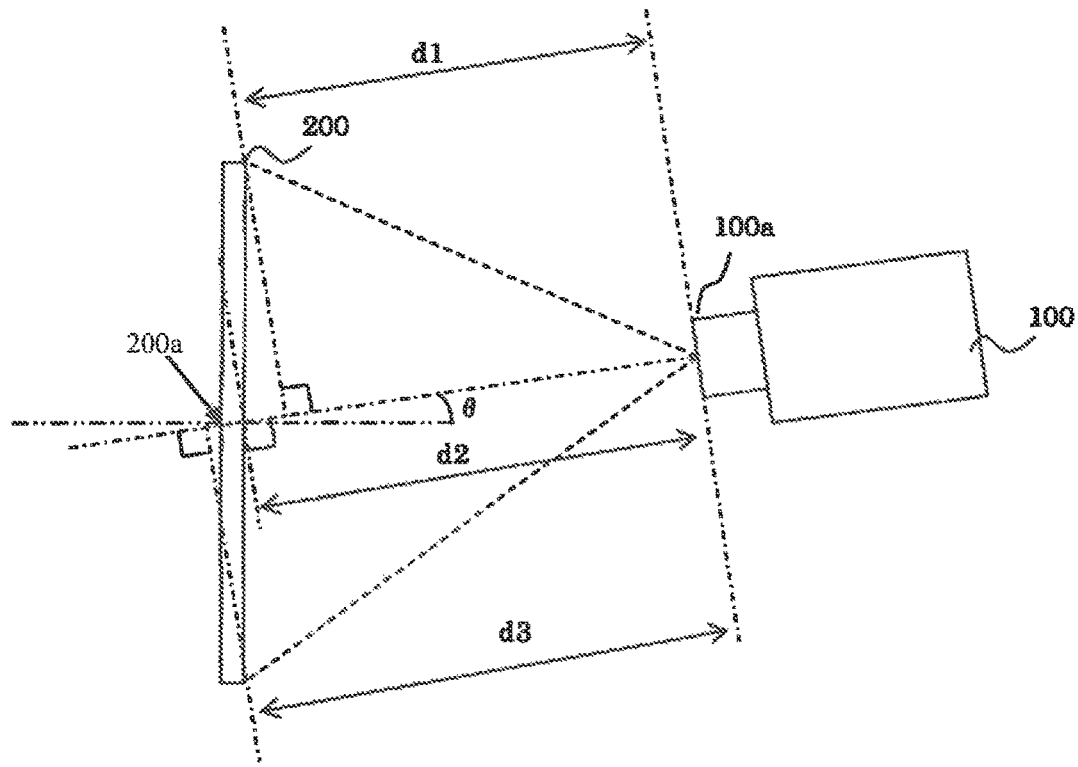

[Figure 5]
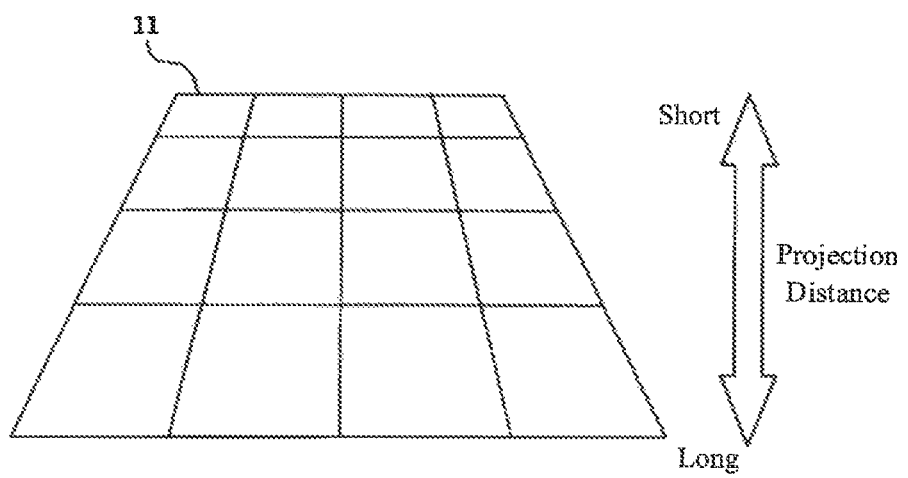

[Figure 6]
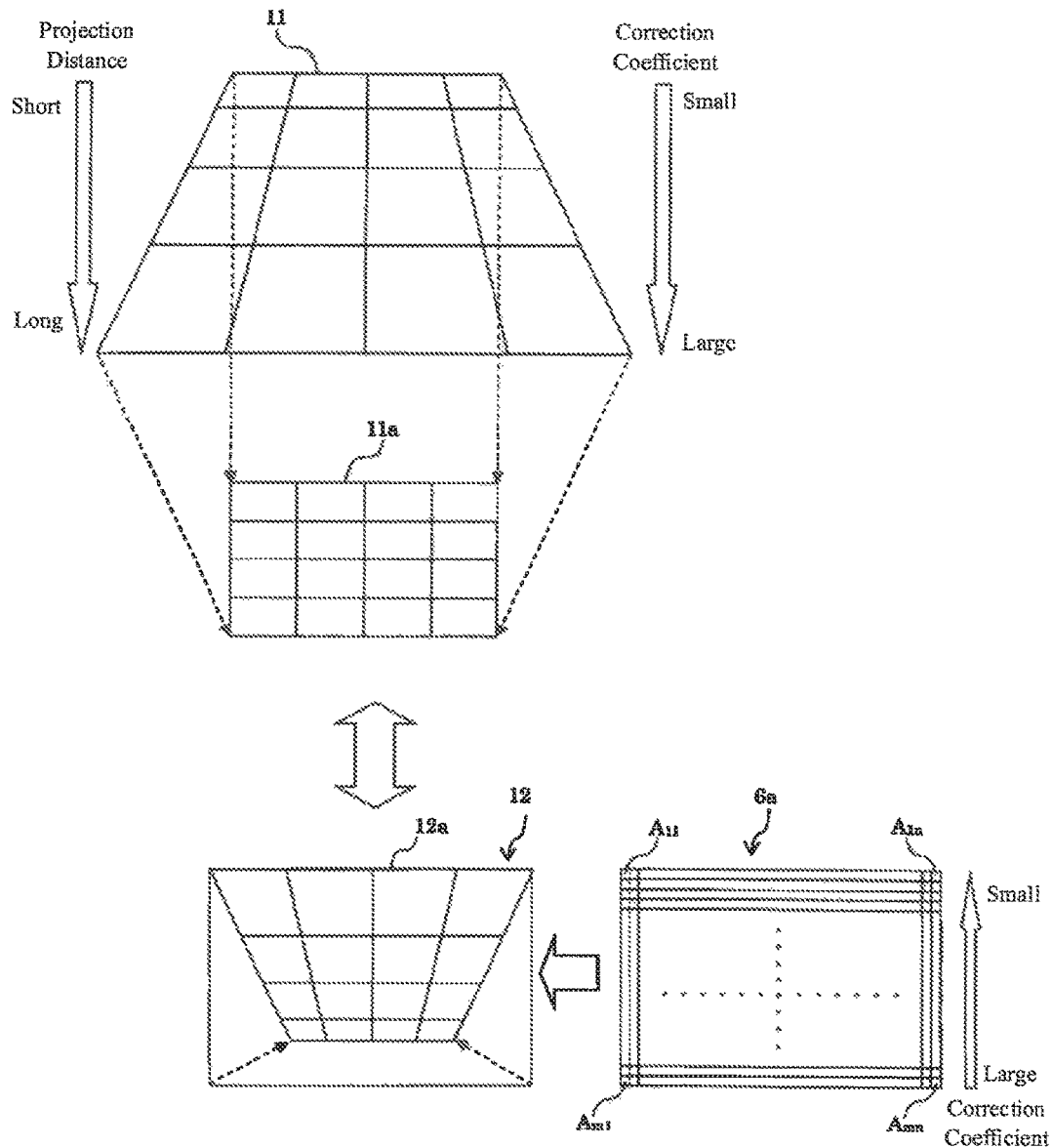

[Figure 7]
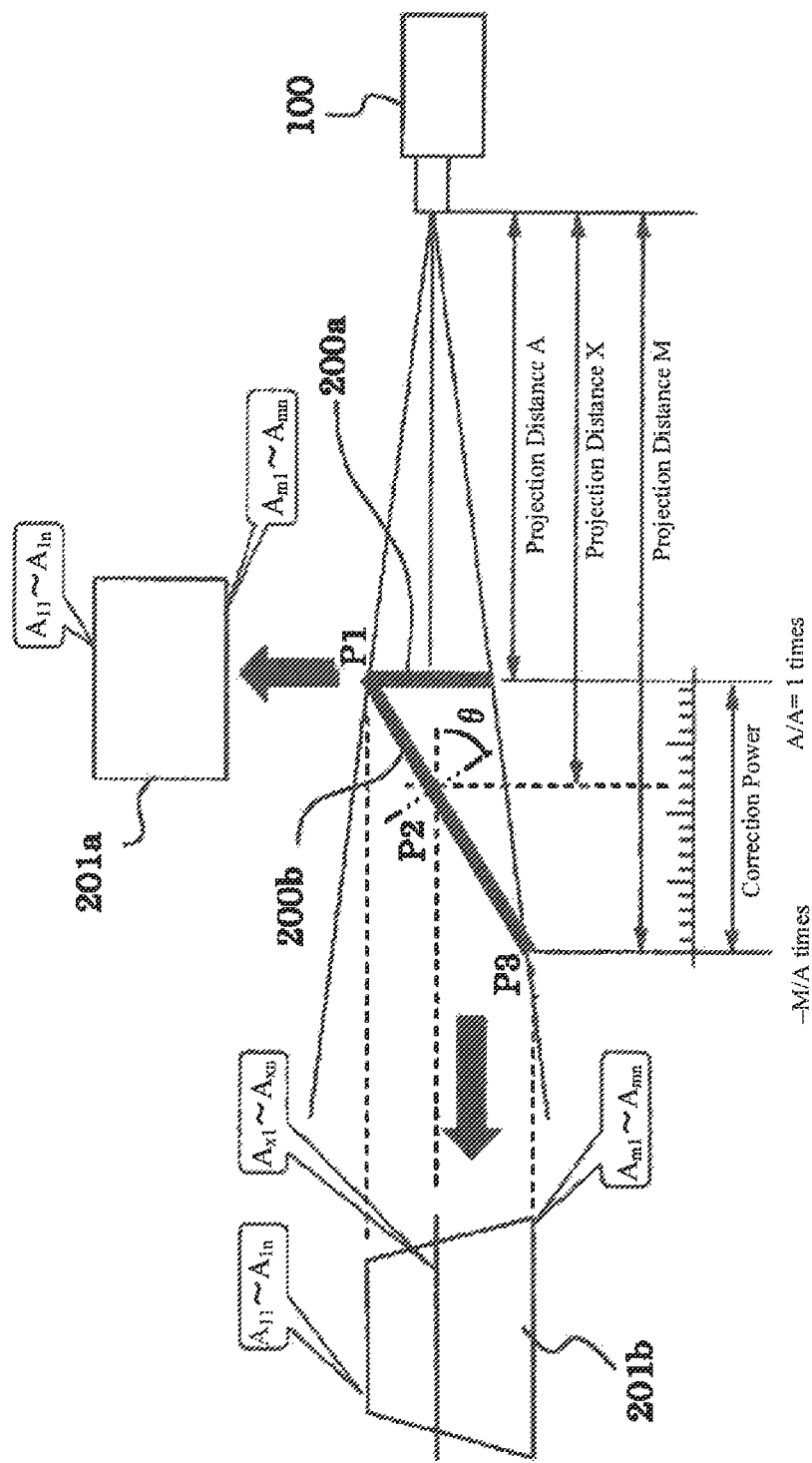

[Figure 8]
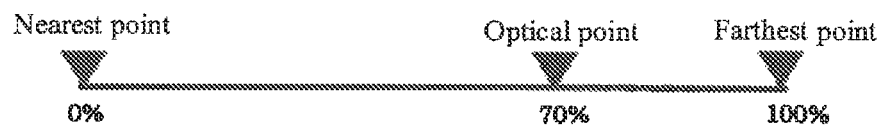
[Figure 9]
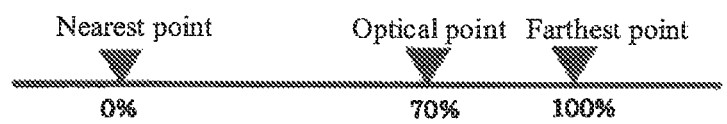

[Figure 10]
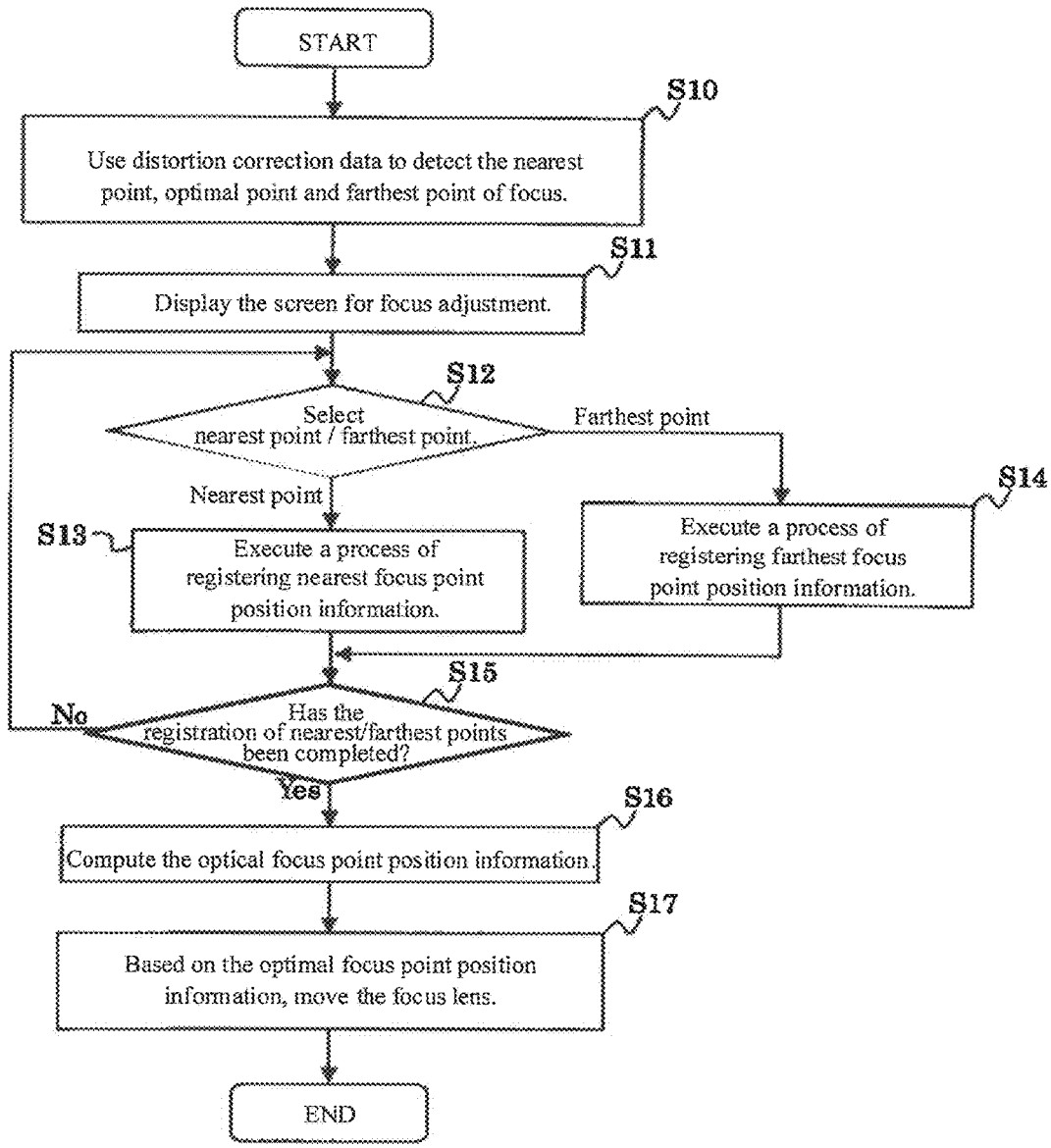

[Figure 11]
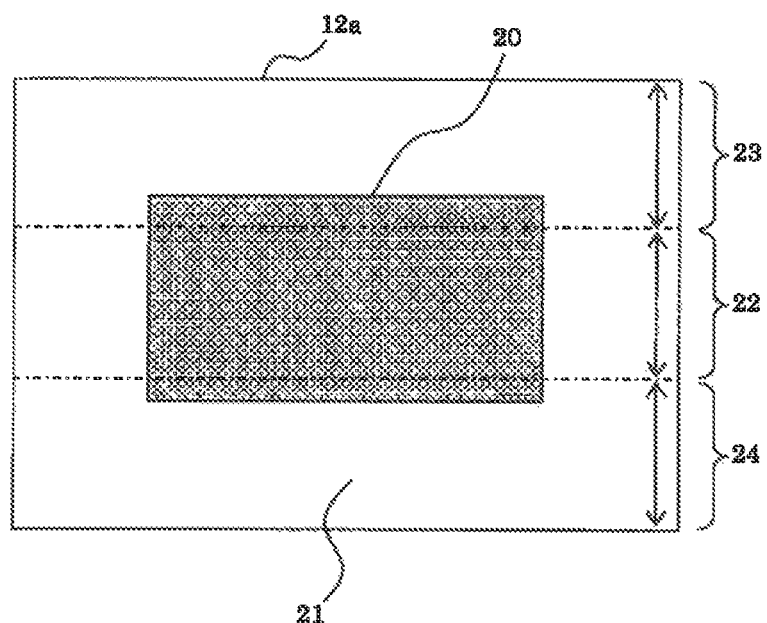
[Figure 12]
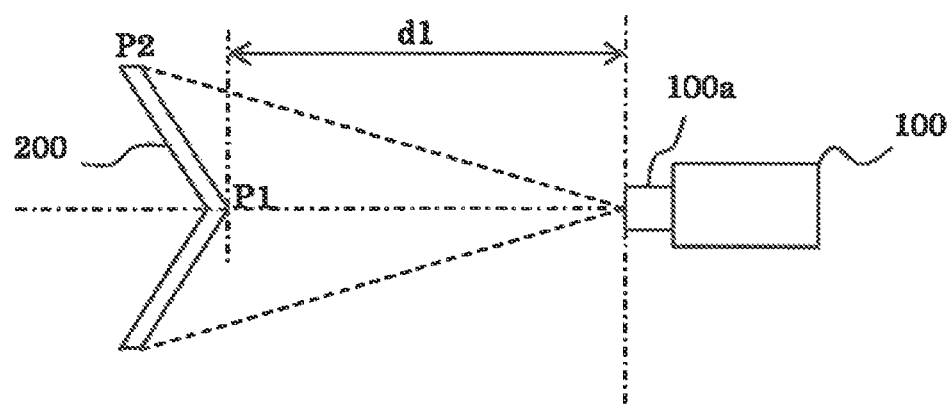

[Figure 13]
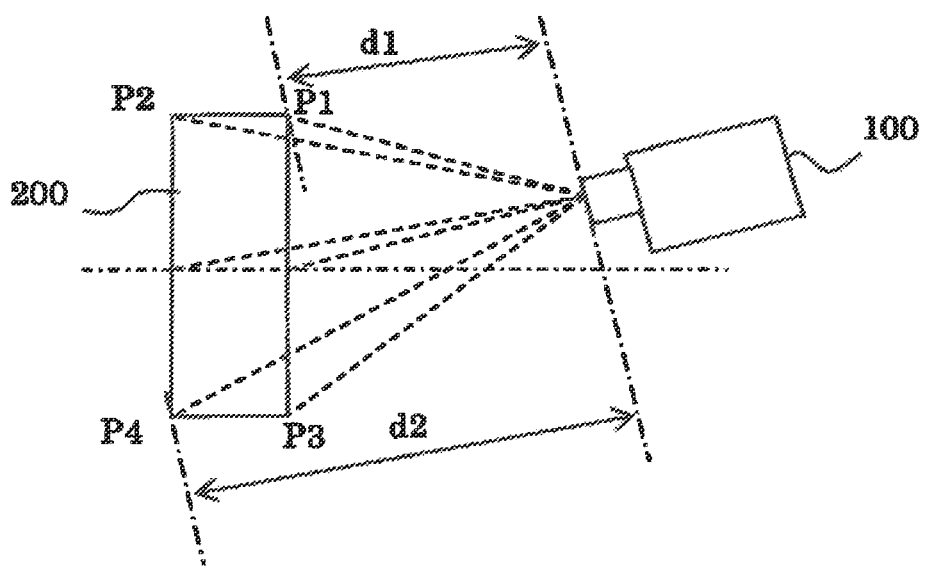

[Figure 14]
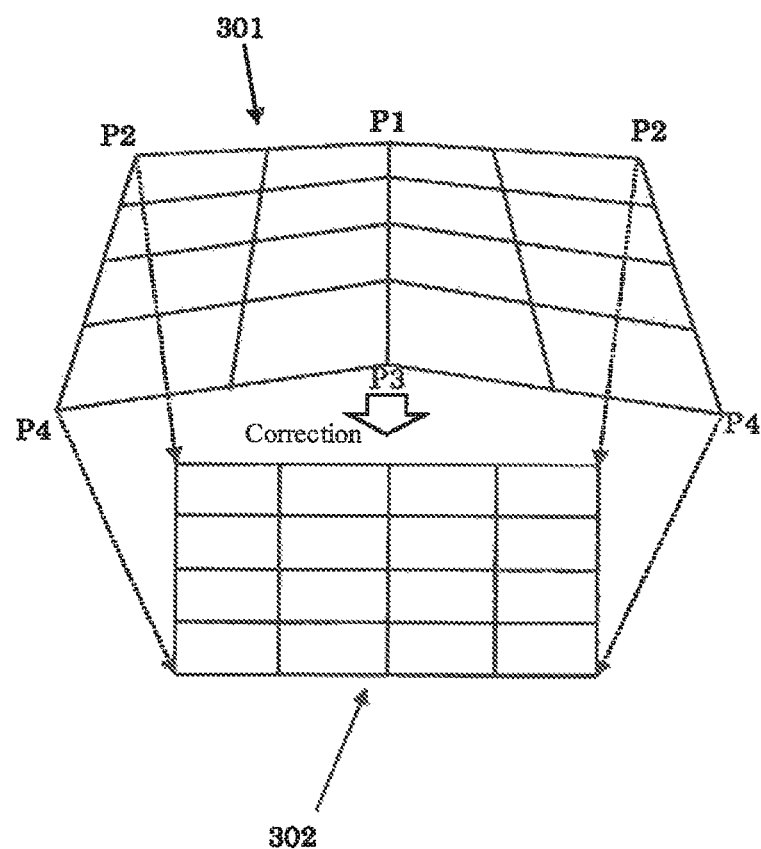

PROJECTOR AND FOCUS ADJUSTMENT METHOD

TECHNICAL FIELD

The present invention relates to a projector that allows focus adjustment and to a focus adjustment method.

BACKGROUND ART

Patent Document 1 discloses a projector that has a projection lens optical system, an automatic focal point detection device, and an angle detection device. The projection lens optical system projects an image on a screen. The projection lens optical system is able to move in the direction of the optical axis.

The automatic focal point detection device is provided with a photo-detection element for imaging the projected image. The automatic focal point detection device uses a photo-detection element to capture the image of the projected image on the screen while moving the projection lens optical system along the direction of the optical axis and detects as the focus position the position at which the high-frequency component of the image that was captured becomes a maximum. The automatic focal point detection device causes the projection lens optical system to move to the detected focus position.

The angle detection device is provided with a pair of line sensors that photo-detect image light from the screen. After the projection lens optical system has been moved to the focus position, the angle detection device uses the pair of line sensors to measure each of the distances from the projector to a plurality of sites of the projected image on the screen. The angle detection device then, based on the result of measuring the distance of each site, finds the angle of inclination of the optical axis of the projection lens optical system with respect to the screen and carries out trapezoidal distortion correction according to this angle of inclination.

After the trapezoidal distortion correction, the angle detection device again uses the pair of line sensors to measure each of the distances from the projector to the plurality of sites of the projected image on the screen. The angle detection device then, based on the results of measuring the distance of each site, moves the projection lens optical system to perform focus readjustment.

LITERATURE OF THE PRIOR ART

Patent Documents

Patent Document 1: Japanese Unexamined Patent Application Publication No. 2004-347907

SUMMARY OF THE INVENTION

However, the projector described in Patent Document 1 requires a photo-detection element and a pair of line sensors for focus adjustment and therefore entails higher cost and increased size of the device.

Still further, when the projector as described in Patent Document 1 projects a picture upon a projection surface that is not flat, such as a solid object, problems occur such as those described below.

Normally, when a picture is projected upon a projection surface that is not flat such as a solid object, focus can be achieved only on a portion of the projection surface. As a result, a region that is focused (focused region) and a region that is not focused (unfocused region) are formed in the projected region. The range of the focused region differs according to which portions of the projected surface are focused. Taking into consideration the characteristics of human vision, the proportion of the focused region is preferably made as large as possible in order to provide a picture of good picture quality.

However, in the projector as described in Patent Document 1, the focus adjustment of the projection lens optical system is carried out without giving consideration to the proportion of the focused region, and as a result, when a picture is projected upon a projection surface that is not flat, cases may occur in which the focused region is reduced and good picture quality cannot be achieved.

It is an object of the present invention to provide a projector and a focus adjustment method that can achieve lower cost and smaller size, and that can provide a picture of good picture quality even when a picture is projected upon a surface that is not flat, such as a solid object.

According to one aspect of the present invention for achieving the above-described object, a projector is provided that includes:

a display element that is provided with an image-forming surface made up of a plurality of pixels;

a projection lens that is capable of focus adjustment and that projects an image that is formed on the image-forming surface upon a projection surface;

a distortion correction processing unit that, based on distortion correction data for correcting distortion of an image that is projected on the projection surface, enlarges and/or reduces an image that is indicated by a video signal received as input to generate a corrected image and causes formation of the corrected image on the image-forming surface; and a control unit that, based on the distortion correction data, carries out focus adjustment of the projection lens such that a focus range on the projection surface increases.

According to another aspect of the present invention, a focus adjustment method is provided that is the focus adjustment method of a projector provided with a display element that is equipped with an image-forming surface made up of a plurality of pixels and a projection lens that is capable of focus adjustment and that projects an image formed on the image-forming surface upon a projection surface; the focus adjustment method including:

based on distortion correction data for correcting distortion of an image that is projected upon a projection surface, enlarging and/or reducing an image that is indicated by a video signal that is received as input to generate a corrected image and forming the corrected image on the image-forming surface; and based on the distortion correction data, carrying out focus adjustment of the projection lens such that a focus range on the projection surface increases.

BRIEF DESCRIPTION OF THE DRAWINGS

FIG. 1 is a block diagram showing the configuration of a projector according to an example embodiment of the present invention.

FIG. 2 is a schematic view showing the state in which a projector is arranged directly opposite a screen.

FIG. 3 is a schematic view showing the projection screen when directly opposite.

FIG. 4 is a schematic view showing the state in which a projector is arranged so as to project obliquely with respect to the screen.

FIG. 5 is a schematic view showing the projection screen at the time of oblique projection.

FIG. 6 is a view for describing the relation between correction coefficients and trapezoidal distortion correction that is carried out for the projected image shown in FIG. 5.

FIG. 7 is a schematic view for describing the relation between a projected image and correction coefficients.

FIG. 8 is a schematic view showing an example of focus detection position display bars.

FIG. 9 is a schematic view showing an example of focus adjustment position display bars.

FIG. 10 is a flow chart showing a procedure of the focus adjustment process.

FIG. 11 is a schematic view showing an example of the weighting areas and extracted areas.

FIG. 12 is a schematic view showing the state as seen from above in which a projector is arranged to project obliquely from above upon a screen that is provided with a surface that is not flat.

FIG. 13 is a schematic view showing the state as seen from the side in which a projector is arranged to project obliquely from above upon a screen that is provided with a surface that is not flat.

FIG. 14 is a schematic view showing the relation between a projected image that has not undergone distortion correction and a projected image that has undergone distortion correction.

EXAMPLE EMBODIMENTS

Example embodiments of the present invention are next described with reference to the accompanying drawings.

FIG. 1 is a block diagram showing the configuration of a projector according to an example embodiment of the present invention.

Referring to FIG. 1, the projector includes: control unit 1, distortion correction processing circuit 2, OSD (on-screen display) combining circuit 3, display unit 4, projection lens 5, storage unit 6, optimal focus point detection circuit 7, focus adjustment circuit 8, and input operation unit 9. Optimal focus point detection circuit 7 and focus adjustment circuit 8 may also be provided as one function of control unit 1.

Display unit 4 is provided with an image-forming surface that is made up of a plurality of pixels. An image is formed on the image-forming surface by spatially and temporally modulating light from a light source by each pixel. For example, a liquid crystal display or DMD (Digital Micromirror Device) can be used as display unit 4.

Projection lens 5 includes a lens barrel that accommodates a lens group that includes a focus lens and a lens motor that causes the focus lens to move back and forth along the direction of the optical axis. The outer circumference of this lens barrel is provided with a focus ring. The lens motor causes the focus ring to rotate, and the focus lens moves in the direction of the optical axis as this focus ring rotates. The focus lens can also be moved by manually rotating the focus ring. The lens motor supplies a signal (for example, a pulse signal) that indicates the direction of rotation and the rotation amount (the direction of movement of the focus lens and the amount of movement) to control unit 1. Control unit 1 is able to recognize the position on the optical axis of the focus lens based on the output signal of the lens motor. Here, the position on the optical axis of the focus lens may be given by the distance from a reference position.

Input operation unit 9 receives the input operation of the user and supplies an operation signal (also referred to as an instruction signal) that indicates the content of the input operation to control unit 1. For example, the input operation unit 9 includes menu buttons or a focus operation unit and supplies to control unit 1 operation signal S8 that indicates the content of the input operations that used these buttons or operation unit. The user is able to cause movement of the focus lens in a desired direction by using the focus operation unit. The user is further able to operate menu buttons to bring about the display of various setting items and then select desired items. The setting items include a focus adjustment item, and by selecting this focus adjustment item, the user is able to bring about display of an adjustment screen on display unit 4 that includes items necessary for focus adjustment.

Storage unit 6 is a memory device such as a semiconductor memory or a hard disk drive (HDD) and holds data or programs necessary for causing a computer (such as a CPU) to execute processing such as distortion correction or focus adjustment. A program may be supplied via a communication network (such as the Internet) or may be supplied from a recording medium that can be read by a computer. A computer-readable recording medium is, for example, an optical disk such as a CD (Compact Disk) or DVD (Digital Versatile Disk) or a USB (Universal Serial Bus) memory or memory card.

Distortion correction data 6a are stored in storage unit 6 as data that are necessary for distortion correction or focus adjustment. Distortion correction data 6a are data for correcting the distortion of a projected image that occurs when projecting an image from a direction oblique to the projection surface or when the projection surface is not flat and include a correction coefficient value of each pixel of the image-forming surface.

Distortion of a projected image and distortion correction data 6a are next described in detail in an example of trapezoidal correction.

FIG. 2 gives a schematic representation of the state in which a projector is disposed directly opposite a screen, and FIG. 3 gives a schematic representation of the projection screen when directly opposite.

As shown in FIG. 2, the optical axis of projection lens 100a of projector 100 passes through center 200a of screen 200 and the angle formed by the optical axis of projection lens 100a and the surface of screen 200 is 90 degrees. Screen 200 is a flat surface, and projector 100 projects a grid image onto screen 200. In this case, projected image 10 that is free of distortion is displayed on screen 200 as shown in FIG. 3.

FIG. 4 gives a schematic representation of the state in which the projector is arranged to project obliquely with respect to the screen, and FIG. 5 gives a schematic representation of the projection screen at the time of oblique projection.

As shown in FIG. 4, projector 100 projects a grid image onto screen 200 from diagonally above. Although the horizontal direction of screen 200 and the horizontal direction of projector 100 are parallel, the perpendicular direction of projector 100 is inclined by angle θ with respect to the perpendicular direction of screen 200.

The tangential plane that takes as the point of contact the center of the lens that is positioned forwardmost of projection lens 100a is taken as a reference plane. Distance d1 is the distance between the reference plane and the upper edge of screen 200 (the projection distance from projection lens 100a to the upper edge of screen 200). Distance d2 is the distance between the reference plane and the central portion of screen 200 (the projection distance from projection lens 100a to the central portion of screen 200). Distance d3 is the distance between the reference plane and the lower edge of screen 200 (the projection distance from projection lens 100a to the lower edge of screen 200). Distances d1-d3 have the relation d1<d2<d3.

If distance d2 is taken as a reference, the image that is projected at distance d1 that is shorter than distance d2 is reduced compared to the image that is projected at distance d2. On the other hand, the image that is projected at distance d3 that is longer than distance d2 is enlarged compared to the image that is projected at distance d2. As a result, projected image 11 in which trapezoidal distortion occurs is displayed as shown in FIG. 5.

FIG. 6 gives a schematic representation of the relation between correction coefficients and the trapezoidal distortion correction that is performed upon projected image 11 shown in FIG. 5. As shown in FIG. 6, taking as a reference the image region for which the projection distance is shortest, i.e., the upper edge of projected image 11 (the upper side of the trapezoid), the image is corrected on image-forming surface 12 such that projected image 11 becomes projected image 11a of rectangular shape. Here, the upper edge of image-forming surface 12 corresponds to the upper edge of projected image 11.

Taking the upper edge of image-forming surface 12 as a reference, the rectangular original image is corrected to trapezoidal corrected image 12a. Here, the rectangular original image is an image based on input video signal S1. Corrected image 12a is formed by subjecting the original image to an enlargement process (a process of interpolating pixels) and/or a reduction process (a process of thinning out pixels). Rectangular projected image 11a is obtained by projecting corrected image 12a upon screen 200 via projection lens 5.

Distortion correction data 6a includes a correction coefficient value of each pixel for correcting the original image to trapezoidal corrected image 12a. For example, when image-forming surface 12 is made up of m×n pixels, distortion correction data 6a contain correction coefficients $A_{11}$-$A_{mn}$.

FIG. 7 gives a schematic representation of the relation between the projected image and correction coefficients $A_{11}$-$A_{mn}$. In FIG. 7, projector 100 directly confronts screen 200a and is inclined at an angle θ with respect to screen 200b.

Rectangular projected image 201a is displayed on screen 200a. The projection distance from projector 100 to screen 200a is assumed to be A. In this case, the projection distance of each pixel of projected image 201a is always A, and correction coefficients $A_{11}$-$A_{mn}$ are therefore all taken as 1 (=A/A).

On the other hand, trapezoidal projected image 201b is displayed on screen 200b. The projection distance from projector 100 to upper edge P1 of screen 200b is assumed to be A, the projection distance from projector 100 to middle portion P2 of screen 200b is assumed to be X (>A), and the projection distance from projector 100 to lower edge P3 of screen 200b is assumed to be M (>X). Here, each of P1, P2 and P3 correspond to the upper tier, middle tier, and lower tier, respectively, of projected image 201b. When the inclination θ of screen 200b shown in FIG. 7 is the same as the inclination θ of screen 200a shown in FIG. 4, projection distances A, X, and M correspond to distances d1, d2, and d3, respectively.

In projected image 201b, the projection distance of each pixel of the upper edge (the upper side of the trapezoid) is in every case A, and correction coefficients $A_{11}$-$A_{1n}$ that correspond to these pixels are all assumed to be 1 (=A/A). The projection distance of each pixel of the central tier is in each case X, and correction coefficients $A_{x1}$-$A_{xn}$ that correspond to these pixels are therefore all −X/A. The projection distance of each pixel of the lower tier (the bottom side of the trapezoid) is in every case M, and correction coefficients $A_{m1}$-$A_{mn}$ that correspond to these pixels are therefore all −M/A. Here, the negative correction coefficients indicate that the image is to be reduced, and conversely the positive correction coefficients indicate that the image is to be enlarged. In this way, the correction coefficient of each pixel is given by a power of the projection distance of each pixel with respect to the reference projection distance. In other words, the correction coefficient of each pixel is a value that is proportional to the projection distance of each pixel.

Referring again to FIG. 1, distortion correction data 6a are supplied from storage unit 6 to distortion correction processing circuit 2 and optimal focus point detection circuit 7. On the basis of distortion correction data 6a, distortion correction processing circuit 2 corrects input video signal S1 to generate corrected video signal S3 that indicates corrected image 12a. More specifically distortion correction processing circuit 2 generates corrected image 12a by enlarging and/or reducing the original image of input video signal S1 based on the correction coefficient of each pixel. Corrected video signal S3 is supplied to OSD combining circuit 3.

OSD combining circuit 3 supplies to display unit 4 combined video signal S6 in which OSD signal S5 that was supplied from control unit 1 is combined with corrected video signal S3 that was supplied from distortion correction processing circuit 2. When OSD signal S5 is not supplied to OSD combining circuit 3, OSD combining circuit 3 supplies to display unit 4 as combined video signal S6 corrected video signal S3 that was supplied from distortion correction processing circuit 2 without alteration. In display unit 4, an image is formed on image-forming surface 12a based on combined video signal S6.

Based on distortion correction data 6a, optimal focus point detection circuit 7 detects the nearest point, the farthest point, and the optimal point of focus on the projected image. The nearest point of focus means the focus point (the focus point for which the distance is closest) when focus is achieved in the projection region of pixels for which the correction coefficient is a minimum value (absolute value). The farthest point of focus means the focus point (the focus point for which the distance is longest) when focus is achieved in a projection region of pixels for which the correction coefficient is a maximum (absolute value). In the example of FIG. 7, the minimum value of the correction coefficient is 1 (=A/A), and the maximum value of the correction coefficient is M/A.

The optimal point of focus means the focus point when focus is achieved in the projection region that is the broadest area (the area in which the number of pixels is most numerous) among the areas in which pixels having the same correction coefficient are arranged in proximity. For example, in the example of FIG. 7, when the area in which pixels for which the correction coefficient is −X/A are arranged in proximity is the broadest, the focus point is taken as the optimal point when focus is achieved in the projection region of this area.

In some cases, a plurality of areas are detected as the optimal focus point. For example, in the arrangement shown in FIG. 4, when the projection surface of screen 200 is a uniform surface (flat surface) that is free of unevenness, a plurality of areas will be present as the object of the optimal points of focus. In this case, the area that is closest to a predetermined site of the projected image is taken as the object of the optimal focus point. Typically, because the chief subject is usually arranged in the center of the image, the predetermined site may be set to the central portion of the projected image.

Optimal focus point detection circuit 7 supplies control unit 1 with detection signal S4 that includes correction coefficients that correspond to each of the nearest point, the farthest point, and the optimal point of focus and information that indicates which pixels on image-forming surface 12*a* correspond to the nearest point, the farthest point, and the optimal point.

Control unit 1 supplies OSD signal S5 for bringing about display of a screen for focus adjustment to OSD combining circuit 3. The screen for focus adjustment includes an adjustment menu, focus detection position display bars, and focus adjustment position display bars.

FIG. 8 shows an example of the focus detection position display bars. As shown in FIG. 8, the focus detection position display bars indicate the relation among the nearest point, the farthest point, and the optimal point that were detected by optimal focus point detection circuit 7, the optimal point being indicated as a percentage with the nearest point being indicated as 0% and the farthest point being indicated as 100%. The nearest point, the farthest point, and the optimal point are all indicated by black triangular markers. Control unit 1 is able to compute the position (percentage value) of the optimal point on the focus detection position display bars from the relation of the correction coefficients of nearest point, farthest point, and optimal point that are indicated by detection signal S4. In this example, the percentage value of the optimal points is 70%. Markers having other shapes or colors may also be used in place of black triangular markers.

FIG. 9 shows an example of focus adjustment position display bars. As shown in FIG. 9, the focus adjustment position display bars show the positions of the nearest point, the farthest point, and the optimal point in the movable range of the focus lens. In the focus adjustment position display bars, as with the focus detection position display bars, the nearest point, farthest point, and optimal point are represented by black triangular markers. Control unit 1 changes the positions of the markers of the nearest point, the farthest point, and the optimal point on the focus adjustment position display bars according to the amount of movement and the direction of movement of the focus lens while maintaining unchanged the relation of the nearest point, farthest point, and optimal point in the focus detection position display bars.

The adjustment menu includes a nearest focus point adjustment item, farthest focus point adjustment item, and optimal focus point setting item, and the user is able to operate input operation unit 9 to select one item from among these items.

When the nearest focus point adjustment item is selected, control unit 1 executes a process of registering nearest focus point position information. In the nearest focus point position information registration process, control unit 1 acquires information of the position on the optical axis of the focus lens for the nearest focus points.

More specifically, control unit 1 supplies, to OSD combining circuit 3, OSD signal S5 that indicates a nearest point input screen for acquiring positional information of the nearest focus point. The nearest point input screen displays a focus marker (for example, a character such as "+") in the region of pixels that indicate the nearest points on a projection screen. A message is displayed in a portion of the screen indicating that a focus ring or focus operation unit is to be manipulated to carry out focusing in the region in which the focus marker is displayed. The user manipulates the focus ring or focus operation unit to realize focusing in the region in which the focus marker is displayed, and then when a predetermined input operation is carried out, control unit 1 acquires the information of the position on the optical axis of the focus lens and registers the acquired positional information as nearest point positional information in storage unit 6. Here, the positional information may be information of the distance from a reference position on the optical axis.

When the farthest focus point adjustment item is selected, control unit 1 executes a process of registering farthest focus point positional information. In the farthest focus point positional information registration process, control unit 1 acquires information of the position on the optical axis of the focus lens at the farthest focus points.

More specifically, control unit 1 supplies, to OSD combining circuit 3, OSD signal S5 that indicates a farthest point input screen for acquiring positional information of the farthest focus points. The farthest point input screen displays a focus marker (for example, a character such as "H") in a region of pixels that indicate the farthest points on the projection screen. A message is displayed in a portion of the screen that indicates that a focus ring or focus operation unit is to be manipulated to bring about focus in the region in which the focus marker is displayed. The user manipulates the focus ring or focus operation unit to achieve focus in the region in which the focus marker is displayed, and then, when a predetermined input operation is carried out, control unit 1 acquires the information of the position on the optical axis of the focus lens and registers the acquired positional information as farthest point positional information in storage unit 6. Here, the positional information may be information of the distance from a reference position on the optical axis.

When the focus optimal point setting item is selected, control unit 1 computes information of the position of the focus lens on the optical axis at the optimal focus point based on the registered nearest point positional information and farthest point positional information as well as the relation between the nearest point, farthest point, and optimal point shown in FIG. 8. Control unit 1 then both registers the optimal point positional information in storage unit 6 and supplies to focus adjustment circuit 8 focus adjustment signal S7 for causing movement of the focus lens to the position on the optical axis that is indicated by the optimal point positional information.

Focus adjustment circuit 8 causes movement of the focus lens in accordance with focus adjustment signal S7 that was supplied from control unit 1. For example, focus adjustment signal S7 includes information of the distance from the reference position on the optical axis to the position on the optical axis that is indicated by the optimal point positional information, and focus adjustment circuit 8 causes movement of the focus lens based on the distance information.

The operation of the projector of the present example embodiment is next described in greater detail.

FIG. 10 is a flow chart showing the procedure of the focus adjustment process.

When the user uses input operation unit 9 to carry out input operations indicating that the focus adjustment process is to be executed, control unit 1 activates optimal focus point detection circuit 7. Optimal focus point detection circuit 7 then uses distortion correction data 6*a* to detect the nearest point, the farthest point, and the optimal point of focus and supplies detection signal S4 to control unit 1 (Step S10).

Control unit 1 next supplies OSD signal S5 that indicates a screen for focus adjustment to OSD combining circuit 3 to bring about the display of the screen for focus adjustment on the screen (Step S11). The user uses input operation unit 9 to carry out an input operation for selecting the nearest focus point adjustment item or farthest focus point adjustment item from the adjustment menu of the screen for focus adjustment (Step S12).

When operation signal S8 that indicates that the nearest focus point adjustment item has been selected is supplied to control unit 1, control unit 1 supplies OSD signal S5 that indicates the nearest point input screen to OSD combining circuit 3 to bring about display of the nearest point input screen on the screen. The user manipulates the focus ring or focus operation unit to realize focusing in the region in which the focus marker is displayed, and when the predetermined input operation has been carried out, control unit 1 acquires information of the position of the focus lens on the optical axis. Control unit 1 then registers the acquired positional information in storage unit 6 as nearest point positional information (Step S13).

When operation signal S8 that indicates that the farthest focus point adjustment item has been selected is supplied to control unit 1, control unit 1 supplies OSD combining circuit 3 with OSD signal S5 that shows the screen for farthest point input to bring about display of the farthest point input screen on the screen. The user manipulates the focus ring or focus operation unit to realize focusing in the region in which the focus marker is displayed, and when the predetermined input operation is carried out, control unit 1 acquires information of the position of the focus lens on the optical axis. Control unit 1 then registers the acquired positional information in storage unit 6 as farthest point positional information (Step S14).

Control unit 1 next checks whether the nearest point positional information and farthest point positional information have been registered in storage unit 6 (Step S15). If neither the nearest point positional information nor the farthest point positional information have not been registered, the process returns to Step S12.

If the nearest point positional information and farthest point positional information have been registered in storage unit 6, control unit 1 computes information of the position of the focal lens on the optical axis at the optimal focus point on the basis of the nearest point positional information and farthest point positional information and the relation among the nearest point, farthest point, and optimal point shown in FIG. 8 (Step S16).

Control unit 1 next supplies focus adjustment circuit 8 with focus adjustment signal S7 for causing movement of the focus lens to the position on the optical axis that is indicated by the optimal point positional information. Focus adjustment circuit S then causes movement of the focus lens in accordance with focus adjustment signal S7 (Step S17).

According to the projector of the present example embodiment, focus adjustment can be carried out using distortion correction data 6a. Because there is no need to use a photo-detection element or line sensor for focus adjustment in this case, both lower cost and smaller size can be achieved.

According to the projector of the present example embodiment, moreover, the focus lens is moved so as to realize focus at the optimal point of focus that was detected using distortion correction data 6a. The optimal point of focus corresponds to the broadest area among areas on the image-forming surface in which pixels having the same correction coefficient are arranged or areas that are arranged in adjacency. Accordingly, realizing focus at this optimal point enables an increase or maximization of the focus region, and as a result, allows the provision of an image of good picture quality.

The projector of the present example embodiment is one example of the present invention, and the configuration is not limited to the configuration shown in the figures and is open to various modifications. Modifications are next described.

(Modification 1)

Optimal focus point detection circuit 7 demarcates image-forming surface 12a into a plurality of areas and sets a weighting coefficient for each area. The information necessary for this setting of weighting areas is registered in advance. Optimal focus point detection circuit 7 extracts areas in which pixels having the same correction coefficient are arranged in proximity and acquires for each weighting area the number of pixels of the extracted area. Optimal focus point detection circuit 7 computes a value obtained by multiplying the number of pixels that was acquired for each weighting area by the weighting coefficient and takes the sum total value as the number of pixels of the extracted area.

FIG. 11 gives a schematic representation of the weighting areas and an extracted area. In this example, image-forming surface 12a is demarcated into central area 20 and peripheral area 21. The weighting coefficient of central area 20 is "1," and the weighting coefficient of peripheral area 21 is 0.75. Extracted area 22 is positioned in the central portion, extracted area 23 is positioned in the upper portion, and extracted area 24 is in the lower portion. Extracted areas 22-24 are an example of areas in which pixels having the same correction coefficients are arranged in proximity, and in the interest of convenience, the number of pixels contained in the areas are mutually identical when not weighted.

In extracted area 22, optimal focus point detection circuit 7 computes as the number of pixels of extracted area 22 the sum total value of a value obtained by multiplying the number of pixels contained in central area 20 by "1" and a value obtained by multiplying the number of pixels contained in peripheral area 21 by 0.75.

In extracted area 23, optimal focus point detection circuit 7 computes as the number of pixels of extracted area 23 the sum total value of a value obtained by multiplying the number of pixels contained in central area 20 by "1" and a value obtained by multiplying the number of pixels contained in peripheral area 21 by 0.75. In this case, the computed value of the number of pixels of extracted area 23 is smaller than the computed value of the number of pixels of extracted area 22.

In extracted area 24, optimal focus point detection circuit 7 computes as the number of pixels of extracted area 24 the sum total value of a value obtained by multiplying the number of pixels contained in central area 20 by "1" and a value obtained by multiplying the number of pixels contained in peripheral area 21 by 0.75. In this case, the computed value of the number of pixels of extracted area 24 is smaller than the computed value of the number of pixels of extracted area 22.

In the case described above, extracted area 23 is the object area of the optimal focus point.

(Modification 2)

When detecting the optimal focus point, optimal focus point detection circuit 7 may set a permissible error range $\pm\sigma$ to the distortion correction data value. For example, in the example of FIG. 7, when an area is detected in which pixels for which the correction coefficient value (absolute value) is X/A are in proximity, optimal focus point detection circuit 7 detects an area in which pixels for which the correction coefficient value (absolute value) is within the range of (X/A)±σ are in proximity. Here, permissible error range ±σ is preferably set with consideration given to, for example, the depth of focus of projection lens 5.

(Modification 3)

The screen may also be a surface that is not flat, such as a solid object. As an example, FIG. 12 and FIG. 13 give schematic representations of cases in which a projector is arranged to project obliquely from above upon a screen that is provided with a surface that is not flat. FIG. 12 is a view as seen from the upper surface of projector 100, and FIG. 13 is a view as seen from the side surface of projector 100.

In FIGS. 12 and 13, screen 200 is provided with a convex surface in which two surfaces are joined together in a "V" shape and is arranged such that this convex surface is positioned on the side of projector 100. Projection distance d1 from projection lens 100a to central portion P1 of the upper side of screen 200 is the shortest projection distance, and projection distance d2 from projection lens 100a to both ends P2 of the lower side of screen 200 is the greatest projection distance.

FIG. 14 gives a schematic representation of the relation between a projection image that has not undergone distortion correction and a projection image that has undergone distortion correction. When an image is projected onto screen 200 without distortion correction, distortion occurs as in projected image 301. Positions P1-P4 on projected image 301 correspond to positions P1-P4 shown in FIG. 12 and FIG. 13. Distortion correction data 6a has correction coefficient values for correcting projected image 301 that has distortion to a rectangle-shaped projected image 302 that is free of distortion. Distortion correction data 6a can also be created by the method described in FIG. 6 and FIG. 7. More specifically, the correction coefficient value of each pixel is computed taking projection distance d1 of position P1 as projection distance A that is the reference. Using correction data 6a that have been computed in this way, optimal focus point detection circuit 7 detects the nearest point, farthest point, and optimal point of focus.

The foregoing explanation took up an example in which focus adjustment is based on distortion correction data when the projector is inclined upward or downward with respect to the projection surface, but the present invention is not limited to this form. When the projector is directed leftward or rightward with respect to the projection surface, distortion correction data are created that contain correction coefficient values that are proportional to the projection distance of each pixel of the image-forming surface to the projection surface, and the distortion correction process and focus adjustment process are carried out based on this distortion correction data. In addition, when the projector is tilted vertically and horizontally as well, distortion correction data are created that contain correction coefficient values that are proportional to the projection distance of each pixel of the image-forming surface to the projection surface, and the distortion correction process and focus adjustment process can be carried out based on this distortion correction data.

The present invention may adopt forms such as shown in the following Supplementary Notes 1-10 but is not limited to these forms.

[Supplementary Note 1]

A projector includes:

a display element that is provided with an image-forming surface made up of a plurality of pixels;

a projection lens that is capable of focus adjustment and that projects an image that is formed on the image-forming surface upon a projection surface;

a distortion correction processing unit that, based on distortion correction data for correcting distortion of an image that is projected on the projection surface, enlarges and/or reduces an image that is indicated by a video signal received as input to generate a corrected image and causes formation of the corrected image on the image-forming surface; and a control unit that, based on the distortion correction data, carries out focus adjustment of the projection lens such that a focus range on the projection surface increases.

[Supplementary Note 2]

In the projector as described in Supplementary Note 1:

the distortion correction data include, for each of the plurality of pixels, a correction coefficient value that corresponds to the projection distance to the projection surface; and the control unit carries out focus adjustment of the projection lens in which, from among pixel regions in which pixels having the same correction coefficient values are arranged, the pixel region having the greatest number of pixels is taken as an optimal focus point.

[Supplementary Note 3]

In the projector as described in Supplementary Note 2:

the image-forming surface is demarcated into a plurality of areas and a weighting coefficient value is set for each area; and for each pixel region, the control unit computes a value obtained by multiplying the weighting coefficient value by the number of pixels according to the area and then takes the pixel region for which the computed value is greatest as the optimal point.

[Supplementary Note 4]

In the projector as described in Supplementary Note 3:

the plurality of areas include a first area that is positioned in the central portion of the image-forming surface and a second area that surrounds the first area; and the weighting coefficient value of the first area is greater than the weighting coefficient value of the second area,

[Supplementary Note 5]

The projector as described in any one of Supplementary Notes 2 to 4 further includes:

a combining unit that generates a combined image in which an image for focus adjustment is combined with the corrected image and causes the combined image to form on the image-forming surface;

wherein the projection lens includes:

a focus lens; and an operation unit that accepts operation for focus adjustment, causes the focus lens to move along the optical axis according to the operation, and supplies an operation signal that indicates the direction of movement and the amount of movement; and the control unit:

takes a region of pixels having the smallest correction coefficient value as a nearest focus point, takes a region of pixels having the largest correction coefficient values as a farthest focus point, and causes the combining unit to generate a first combined image in which a first image that indicates the nearest focus point is combined as the image for focus adjustment with the corrected image and a second combined image in which a second image that indicates the farthest focus point is combined as the image for focus adjustment with the corrected image;

when the user operates the operation unit to carry out focus adjustment for the first image on the projected image of the first combined image, acquires first positional information that indicates the position of the focus lens on the optical axis when focus is realized at the nearest focus point based on the operation signal;

when the user operates the operation unit to carry out focus adjustment for the second image on the projected image of the second combined image, acquires second positional information that indicates the position of the focus lens on the optical axis when focus is realized at the farthest focus point based on the operation signal; and based on the relation of the correction coefficient values of the nearest focus point, farthest focus point and optimal point and the first and second positional information, acquires the position on the optical axis of the focus lens when focus is realized at the optimal point and causes the focus lens to move to that position.

[Supplementary Note 6]

A focus adjustment method of a projector that is provided with a display element that is equipped with an image-forming surface made up of a plurality of pixels and a projection lens that is capable of focus adjustment and that projects an image formed on the image-forming surface upon a projection surface; the focus adjustment method including:

based on distortion correction data for correcting distortion of an image that is projected upon the projection surface, enlarging and/or reducing an image that is indicated by a video signal that is received as input to generate a corrected image and forming the corrected image on the image-forming surface; and based on the distortion correction data, carrying out focus adjustment of the projection lens such that a focus range on the projection surface is increased.

[Supplementary Note 7]

In the focus adjustment method as described in Supplementary Note 6:

the distortion correction data contain for each of the plurality of pixels a correction coefficient value that corresponds to the projection distance to the projection surface; and the method further including a step of extracting pixel regions in which pixels having the same correction coefficient value are arranged and carrying out focus adjustment of the projection lens with, of these pixel regions, the pixel region having the greatest number of pixels as an optimal point of focus.

[Supplementary Note 8]

The focus adjustment method as described in Supplementary Note 7 further includes:

demarcating the image-forming surface into a plurality of areas and setting a weighting coefficient value for each area; and for each of the pixel regions, computing a value obtained by multiplying the weighting coefficient value by the number of pixels according to each area and taking as the optimal point the pixel region for which the computed value is greatest.

[Supplementary Note 9]

In the focus adjustment method as described in Supplementary Note 8;

the plurality of areas include a first area that is positioned in the central portion of the image-forming surface and a second area that surrounds the first area, and the weighting coefficient value of the first area is greater than the weighting coefficient value of the second area.

[Supplementary Note 10]

In the focus adjustment method as described in any one of Supplementary Notes 7 to 9:

the projection lens includes a focus lens that can be moved along the optical axis; the focus adjustment method further including:

taking the region of pixels having the smallest correction coefficient value as the nearest focus point and forming on the image-forming surface a first combined image in which a first image that indicates the nearest focus point is combined with the corrected image;

acquiring first positional information that indicates the position on the optical axis of the focus lens when focus is realized at the nearest focus point based on input information for focus adjustment that was applied as input by the user for the first image on the projected image of the first combined image;

taking the region of pixels having the largest correction coefficient value as the farthest focus point of focus and forming on the image-forming surface a second combined image in which a second image that indicates the farthest focus point is combined with the corrected image;

acquiring second positional information that indicates the position on the optical axis of the focus lens when focus is realized at the farthest focus point based on input information for focus adjustment that was applied as input by the user for the second image on the projected image of the second combined image; and acquiring the position on the optical axis of the focus lens when focus is realized at the optimal point based on the relation of the correction coefficient values of the nearest focus point, the farthest focus point, and the optimal point and the first and second positional information and moving the focus lens to that position.

EXPLANATION OF REFERENCE NUMBERS 1 control unit
2 distortion correction processing circuit
3 OSD combining circuit
4 display unit
5 projection lens
6 storage unit
6a distortion correction data
7 optimal focus point detection circuit
8 focus adjustment circuit
9 input operation unit

What is claimed is:

1. A projector comprising:
   a display element that is provided with an image-forming surface comprising a plurality of pixels;
   a projection lens that is capable of focus adjustment and that projects an image that is formed on said image-forming surface upon a projection surface;
   a distortion correction processing unit that, based on distortion correction data for correcting distortion of an image that is projected on said projection surface, enlarges and/or reduces an image that is indicated by a video signal that is received as input to generate a corrected image and causes formation of the corrected image on said image-forming surface; and
   a control unit that, based on said distortion correction data, carries out focus adjustment of said projection lens such that a focus range on said projection surface increases, wherein:
   said distortion correction data include, for each of said plurality of pixels, a correction coefficient value that corresponds to a projection distance to said projection surface; and said control unit carries out focus adjustment of said projection lens in which, from among pixel regions in which pixel having a same correction coefficient value are arranged, the pixel region having a greatest number of pixels is taken as an optimal focus point.

2. The projector as set forth in claim 1, wherein:
said image-forming surface is demarcated into a plurality of areas and a weighting coefficient value is set for each area; and
for each pixel region, said control unit computes a value obtained by multiplying said weighting coefficient value by a number of pixels according to said area and then takes as said optimal focus point the pixel region for which the computed value is greatest.

3. The projector as set forth in claim 2, wherein:
said plurality of areas include a first area that is positioned in a central portion of said image-forming surface and a second area that surrounds said first area; and
the weighting coefficient value of said first area is greater than the weighting coefficient value of said second area.

4. The projector as set forth in claim 3, further comprising:
a combining unit that generates a combined image in which an image for focus adjustment is combined with said corrected image and causes the combined image to form on said image-forming surface;
wherein said projection lens includes:
a focus lens; and
an operation unit that accepts operation for focus adjustment, causes said focus lens to move along an optical axis according to the operation, and supplies an operation signal that indicates a direction of movement and an amount of movement; and
said control unit:
takes a region of pixels having a smallest correction coefficient value as a nearest focus point, takes a region of pixels having a largest correction coefficient values as a farthest focus point, and causes the combining unit to generate a first combined image in which a first image that indicates said nearest focus point is combined as said image for focus adjustment with said corrected image and a second combined image in which a second image that indicates said farthest focus point is combined as said image for focus adjustment with said corrected image;
when a user operates said operation unit to carry out focus adjustment for said first image on the projected image of said first combined image, acquires first positional information that indicates a position on said optical axis of said focus lens when focus is realized at said nearest focus point based on said operation signal;
when the user operates said operation unit to carry out focus adjustment for said second image on the projected image of said second combined image, acquires second positional information that indicates a position on said optical axis of said focus lens when focus is realized at said farthest focus point based on said operation signal; and
based on the relation of said correction coefficient values of said nearest focus point, said farthest focus point and said optimal focus point and said first and second positional information, acquires a position on said optical axis of said focus lens when focus is realized at said optimal focus point and causes said focus lens to move to the position.

5. The projector as set forth in claim 2, further comprising:
a combining unit that generates a combined image in which an image for focus adjustment is combined with said corrected image and causes the combined image to form on said image-forming surface;
wherein said projection lens includes:
a focus lens; and
an operation unit that accepts operation for focus adjustment, causes said focus lens to move along an optical axis according to the operation, and supplies an operation signal that indicates a direction of movement and an amount of movement; and
said control unit:
takes a region of pixels having a smallest correction coefficient value as a nearest focus point, takes a region of pixels having a largest correction coefficient values as a farthest focus point, and causes the combining unit to generate a first combined image in which a first image that indicates said nearest focus point is combined as said image for focus adjustment with said corrected image and a second combined image in which a second image that indicates said farthest focus point is combined as said image for focus adjustment with said corrected image;
when a user operates said operation unit to carry out focus adjustment for said first image on the projected image of said first combined image, acquires first positional information that indicates a position on said optical axis of said focus lens when focus is realized at said nearest focus point based on said operation signal;
when the user operates said operation unit to carry out focus adjustment for said second image on the projected image of said second combined image, acquires second positional information that indicates a position on said optical axis of said focus lens when focus is realized at said farthest focus point based on said operation signal; and
based on a relation of said correction coefficient values of said nearest focus point, said farthest focus point and said optimal focus point and said first and second positional information, acquires a position on said optical axis of said focus lens when focus is realized at said optimal focus point and causes said focus lens to move to the position.

6. The projector as set forth in claim 1, further comprising:
a combining unit that generates a combined image in which an image for focus adjustment is combined with said corrected image and causes the combined image to form on said image-forming surface;
wherein said projection lens includes:
a focus lens; and
an operation unit that accepts operation for focus adjustment, causes said focus lens to move along an optical axis according to the operation, and supplies an operation signal that indicates a direction of movement and an amount of movement; and
said control unit:
takes a region of pixels having a smallest correction coefficient value as a nearest focus point, takes a region of pixels having a largest correction coefficient values as a farthest focus point, and causes the combining unit to generate a first combined image in which a first image that indicates said nearest focus point is combined as said image for focus adjustment with said corrected image and a second combined image in which a second image that indicates said farthest focus point is combined as said image for focus adjustment with said corrected image;

when a user operates said operation unit to carry out focus adjustment for said first image on the projected image of said first combined image, acquires first positional information that indicates a position on said optical axis of said focus lens when focus is realized at said nearest focus point based on said operation signal;

when the user operates said operation unit to carry out focus adjustment for said second image on the projected image of said second combined image, acquires second positional information that indicates a position on said optical axis of said focus lens when focus is realized at said farthest focus point based on said operation signal; and based on a relation of said correction coefficient values of said nearest focus point, said farthest focus point and said optimal focus point and said first and second positional information, acquires a position on said optical axis of said focus lens when focus is realized at said optimal focus point and causes said focus lens to move to the position.

7. A focus adjustment method of a projector that includes a display element that is equipped with an image-forming surface comprising a plurality of pixels and a projection lens that is capable of focus adjustment and that projects an image that is formed on said image-forming surface upon a projection surface; said focus adjustment method comprising:

based on distortion correction data for correcting distortion of an image that is projected upon said projection surface, enlarging and/or reducing an image that is indicated by a video signal that is received as input to generate a corrected image and forming the corrected image on said image-forming surface; and based on said distortion correction data, carrying out focus adjustment of said projection lens such that a focus range on said projection surface is increased, wherein;

said distortion correction data include, for each of said plurality of pixels, a correction coefficient value that corresponds to a projection distance to said projection surface; and the focus adjustment of said projection lens is carried out in which, from among pixel regions in which pixels having a same correction coefficient value are arranged, the pixel region having a greatest number of pixels is taken as an optimal focus point.

* * * * *